(12) United States Patent
Wang et al.

(10) Patent No.: US 7,299,580 B2
(45) Date of Patent: Nov. 27, 2007

(54) MOUNTING STRUCTURE FOR A DISPLAY

(75) Inventors: Beniz Wang, Taipei (TW); Yu-Chi Lin, Taipei (TW)

(73) Assignee: Inventec C'orporation, Taipei (TW)

( * ) Notice: Subject to any disclaimer, the term of this patent is extended or adjusted under 35 U.S.C. 154(b) by 246 days.

(21) Appl. No.: 11/284,977

(22) Filed: Nov. 22, 2005

(65) Prior Publication Data
US 2007/0113458 A1   May 24, 2007

(51) Int. Cl.
*A47G 1/06* (2006.01)
(52) U.S. Cl. .................. 40/719; 40/753; 248/461; 248/463; 361/681
(58) Field of Classification Search .............. 40/719, 40/753; 248/441.1, 461, 463, 465; 361/681; 349/58
See application file for complete search history.

(56) References Cited

U.S. PATENT DOCUMENTS

| | | | | |
|---|---|---|---|---|
| 3,185,233 | A * | 5/1965 | Provi | 177/239 |
| 5,329,712 | A * | 7/1994 | Keller | 40/747 |
| 5,396,399 | A * | 3/1995 | Blair et al. | 361/681 |
| 6,191,940 | B1 * | 2/2001 | Ma | 361/681 |
| 6,570,627 | B1 * | 5/2003 | Chang | 348/794 |
| 6,651,943 | B2 * | 11/2003 | Cho et al. | 248/122.1 |
| 6,678,153 | B2 * | 1/2004 | Chen et al. | 361/681 |
| 6,807,050 | B1 * | 10/2004 | Whitehorn et al. | 361/681 |
| 6,975,507 | B2 * | 12/2005 | Wang et al. | 361/683 |
| 7,106,578 | B2 * | 9/2006 | Chen | 361/681 |
| 7,249,739 | B2 * | 7/2007 | Chueh et al. | 248/133 |
| 2003/0025063 | A1 * | 2/2003 | Chen et al. | 248/918 |
| 2004/0201871 | A1 * | 10/2004 | Risheq | 358/474 |
| 2005/0253040 | A1 * | 11/2005 | Yang | 248/688 |
| 2006/0050471 | A1 * | 3/2006 | Chen | 361/681 |
| 2006/0077623 | A1 * | 4/2006 | Yeh | 361/681 |
| 2006/0082957 | A1 * | 4/2006 | Chen | 361/681 |

\* cited by examiner

*Primary Examiner*—Gary C. Hoge
(74) *Attorney, Agent, or Firm*—Apex Juris, pllc; Tracy M. Heims

(57) ABSTRACT

A mounting structure for a display is provided. The mounting structure includes a body used for supporting the display, a mounting portion connected pivotally to the body so that a lower end thereof is able to swing back and forth within a predetermined range, a movable handle movable up and down on the body within a predetermined range, and a link connected pivotally to a predetermined portion of the movable handle at an interior end and connected pivotally to a predetermined portion of the mounting portion and being a predetermined distance away from an upper portion of the mounting portion. As such, the mounting structure may stay at an extension or retract position by pushing or pulling the movable handle based on requirement of a user of the display.

7 Claims, 4 Drawing Sheets

MOUNTING STRUCTURE FOR A DISPLAY

BACKGROUND OF THE INVENTION

1. Field of the Invention

The present invention relates to support and position maintenance of a display, and particularly to a mounting structure for a display.

2. Description of the Related Art

As the electronic technology involves considerably, human economic conditions are improved and expenditure concept changes, electrical, electronic or communications products are becoming more and more at families of being economically well-fixed. Although some of them are developed to be slighter and compacter, such as mobile phones and digital cameras, still some others of them are developed to be large-sized, such as televisions and computer displays. Although the user may be much facilitated and entertained with the more and more electronic products and the larger and larger displays, portability and management problems of these products are concurrently arisen. Further, the large display products may also take too much occupancy and thus reduce space for other uses. To solve this problem, manufacturers of these products aim to incorporation of some electronic products. For instance, a digital camera is incorporated into a mobile phone. As another example, a digital camera, a recorder pen, an EZ drive and a music MPEG Layer-3 player are incorporated as a new product. Among them, a thinner computer and television or a computer and television combination can be the most efficient in achieving space saving. However, there is still not any thin and slight television or computer display which may be firmly fixed and become smaller and easy to be put in storage or moved when it is not in use or moved.

SUMMARY OF THE INVENTION

It is, therefore, an object of the present invention to provide a mounting structure for a display where a handle thereof may be retracted and thus hidden. To achieve the above object, the mounting structure for a display according to the present invention includes a body, a movable handle connected pivotally at the body in such a manner that a lower end of the movable handle may swing back and forth within a predetermined range and a link connected pivotally to a predetermined portion of the movable handle at its interior side and connected pivotally to a predetermined portion of the mounting structure at its exterior side, which is a predetermined distance away from the upper end of the mounting structure.

An advantage of the present invention is that the mounting structure may stay at an extension or retract position by pushing or pulling the movable handle based on requirement of a user of the display.

To enable technical features of the display movable in two dimensions of the present invention to be apparent to those skilled in the art, the present invention will be specifically described below in conjunction with the accompanying drawings.

BRIEF DESCRIPTION OF THE DRAWINGS

The accompanying drawings, which are incorporated into and constitute a part of this specification, illustrate embodiments of the present invention and, together with the detailed description, serve to explain the principles and implementations of the invention. The figures are not to scale. In the drawings.

DETAILED DESCRIPTION OF THE INVENTION

Figure 1:
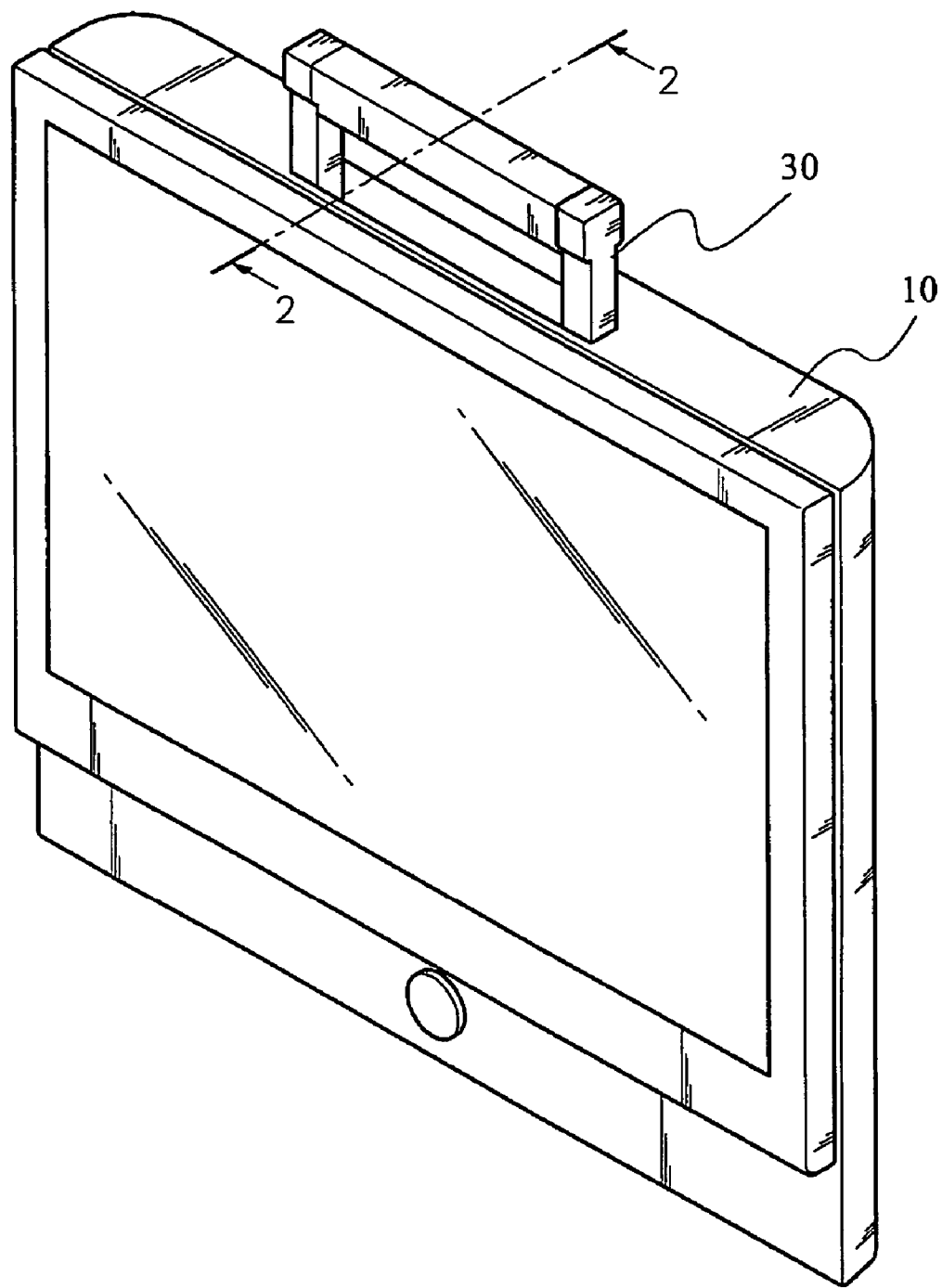
FIG. 1 shows a perspective view of a mounting potion at a retract state according to a preferred embodiment of the present invention.

The mounting structure of a display according to the present invention will be explained below with reference to FIG. 1 through FIG. 4. The mounting structure for a display includes a body 10 and a mounting portion 20 and a movable handle 30. The body 10 is used to support the display. The mounting portion 20 is connected pivotally to the body 10. The movable handle 30 is used to control retract or extension of the mounting portion 20 or may be pulled by a user when the display is moved.

The body 10 has a guide groove 12 located at a rear side thereof at a central region and extending longitudinally with a proper length and a proper width. Further, a first guide track 14 is disposed on two interior walls of the guide groove 12 and extending longitudinally with a slightly arc shape (viewed from front of the drawing).

The mounting portion 20 is connected pivotally to the body 10 at an upper end and may swing in a considerable range. In this embodiment, the mounting portion 20 is slightly like a sheet and has a considerable width so that the mounting portion 20 may be hidden within an indentation region at the rear side of the body 10.

The movable handle 30 is slightly in an inverse "U" shape and inserted slidably up and down into the guide grove 12. A second guide track 32 is further disposed transversely with a proper length at a lower end of each branch of the movable handle 30.

A link 40 is connected pivotally to a central region of an interior side of the mounting portion 20 facing the body 10 at its external side. The link 40 is further connected to a pin at its interior side in such a manner that the pin is inserted rotatably and slidably freely into the first and second guide track 14, 32 concurrently.

Figure 2:
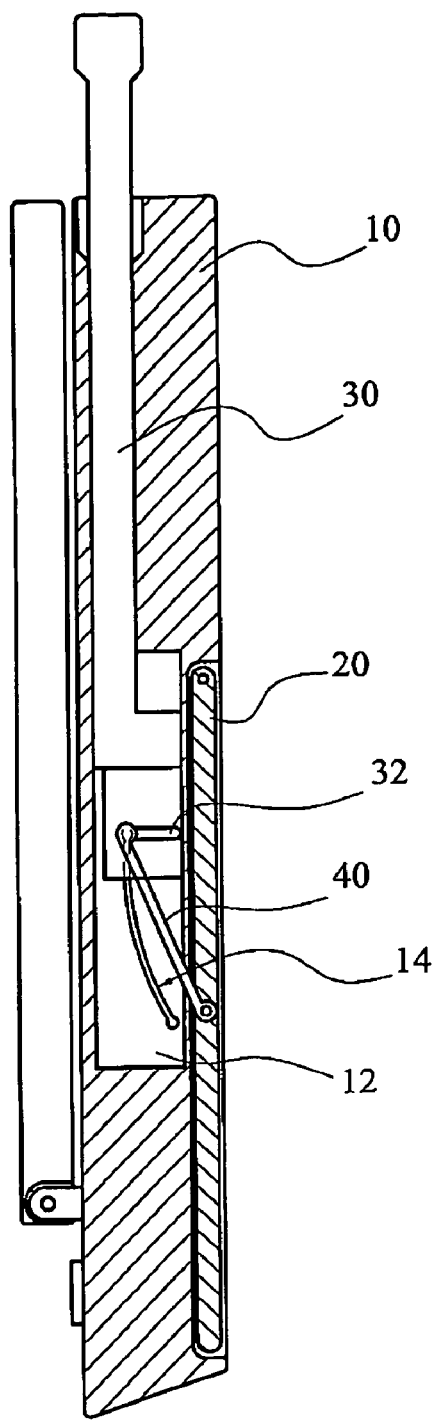
FIG. 2 shows a cross-sectional view of the mounting portion, which is taken along line A-A in FIG. 1 according to the preferred embodiment of the present invention.

By means of a linkage composed of the mounting portion 20, the movable handle 30 and the link 40, the mounting portion 20 is compelled to stack stably on the rear side of the body 10 when the user pulls the movable handle 30 upward (shown in FIGS. 1 and 2). This is because the mounting portion 20 is compelled to swing internally about an axis formed by an upper end thereof since the interior side of the link 40 is guided to move upward as the movable handle 30 is pulled upward. As such, not only the mounting portion 20 may be retracted but the movable handle 30 may be taken as a handle for carrying the display.

Figure 3:
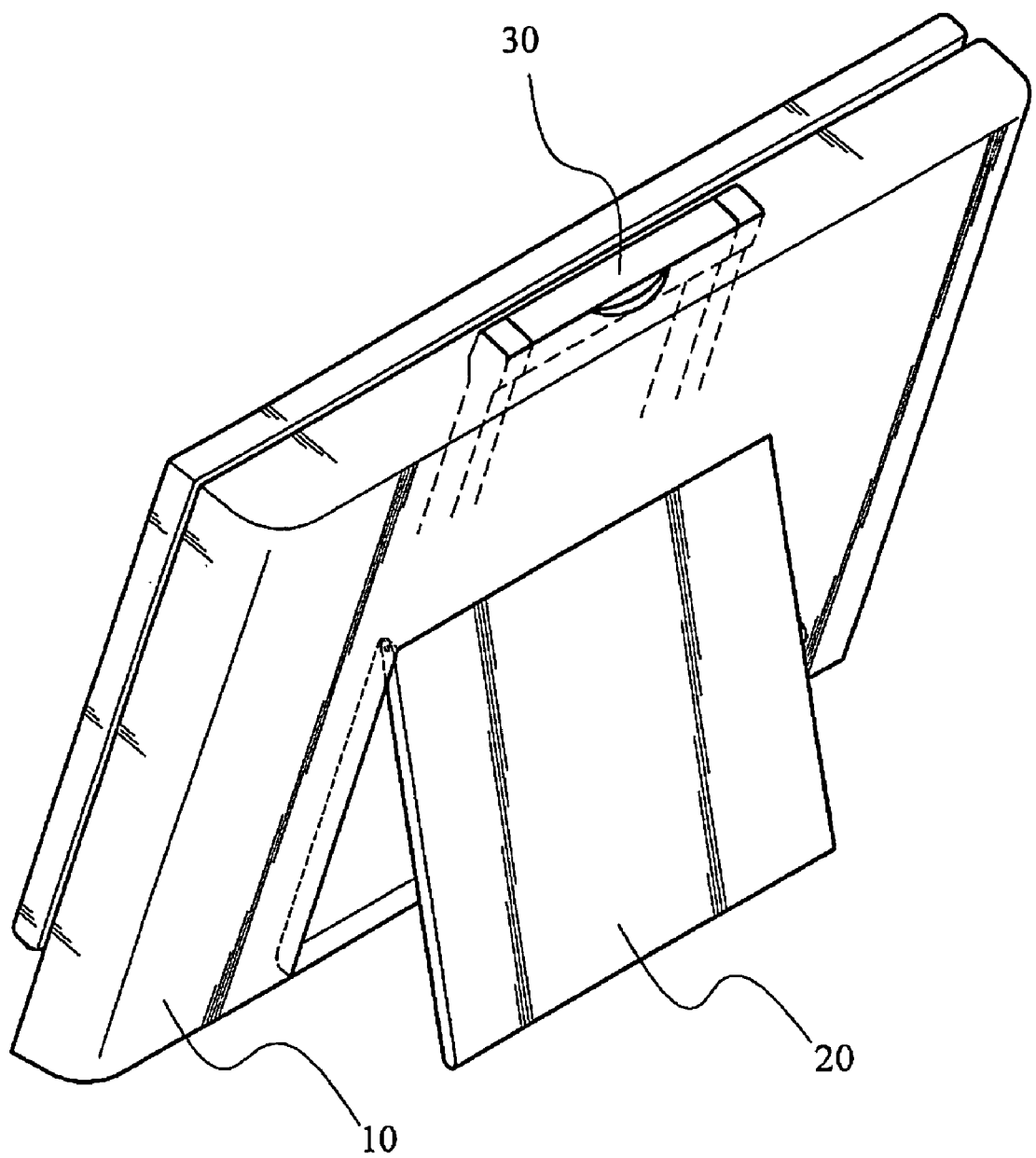
FIG. 3 shows a perspective view of the mounting portion at an extension state according to a preferred embodiment of the present invention.
Figure 4:
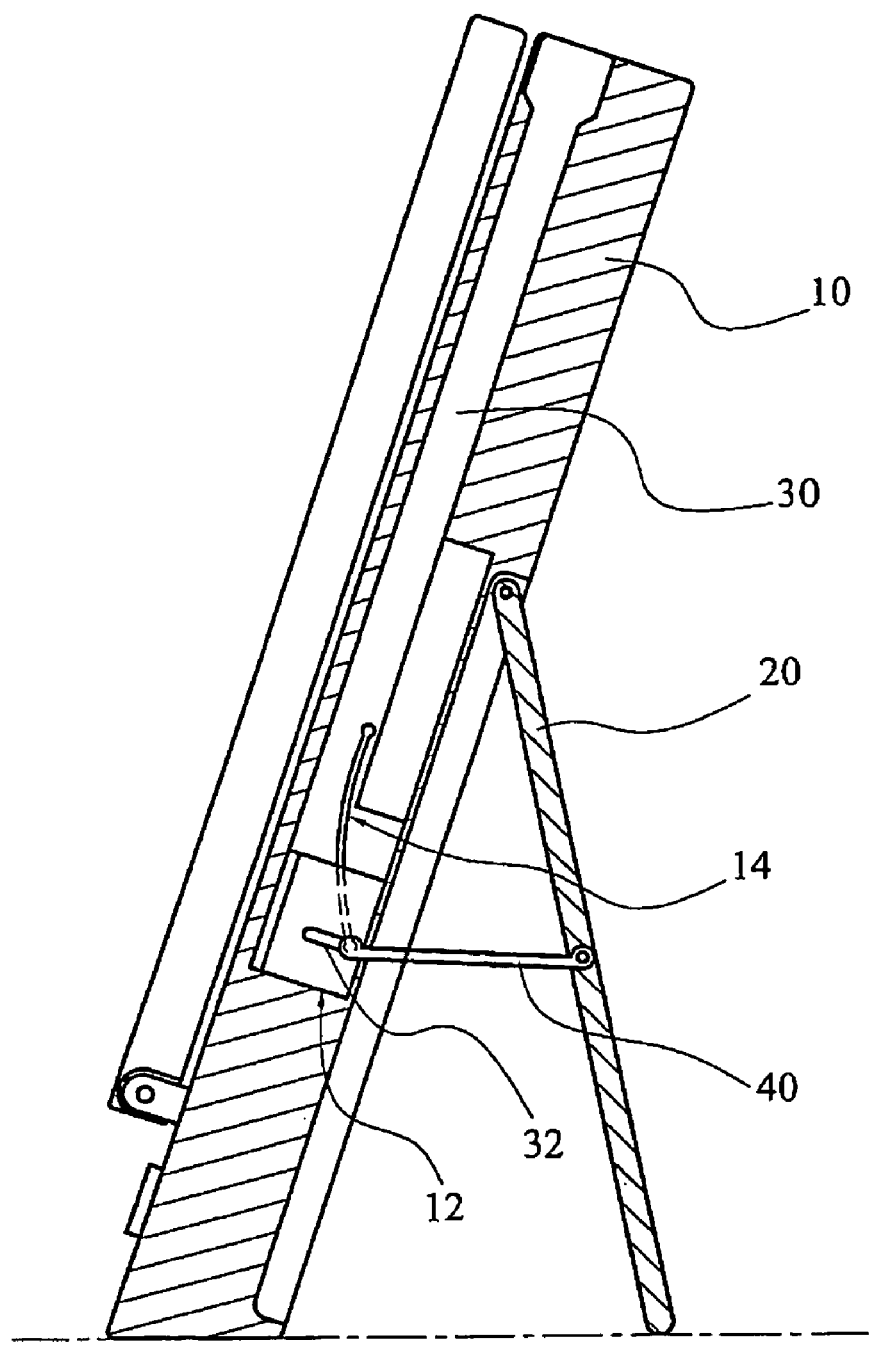
FIG. 4 shows a cross-sectional view of the mounting portion at an extension state according to a preferred embodiment of the present invention.

On the other hand, when the user pushes the movable handle 30 downward, the interior side of the link 40 is caused to move downward along an extension direction of the first track 14 and outward along an extension direction of the second track 32. Since the link 40 swings along the arc path in a smooth manner, the mounting portion 20 is compelled by the exterior side of the link 40 to swing outward at a proper angle (as shown in FIGS. 3 and 4). As such, the display may not only stand at a slightly tilting angle but also the push handle 30 may be buried or hidden into the body 10.

The mounting structure for a display of this invention has been described through the preferred embodiment. However, it is merely a practicable form but not intended to limit scope of the present invention. This invention may be presented with other embodiments and forms, which may be deduced through the above disclosure. Such modification and variation should be deemed within the scope of the present invention which is recited in the appended claims.

What is claimed is:

1. A mounting structure for a display, comprising:
   a body used for supporting the display;
   a mounting portion connected pivotally to the body so that a lower end thereof being able to swing back and forth;
   a movable handle movable up and down on the body; and
   a link connected pivotally to the movable handle at an interior side thereof and connected pivotally to the mounting portion at an external side thereof and being a predetermined distance away from an upper portion of the mounting portion.

2. The mounting structure according to claim 1, wherein a guide groove is disposed at the body and a lower end of a movable handle moves back and forth within the guide grove.

3. The mounting structure according to claim 1, wherein a first guide track is disposed at the body and the interior side of said link is disposed within the first guide track thereof and movable back and forth therein.

4. The mounting structure according to claim 2, wherein a second guide track is disposed at the lower end of the movable handle and the interior side of said link is disposed within the second guide track and movable therein.

5. The mounting structure according to claim 3, wherein the first track extends along a direction along which the movable handle moves.

6. The mounting structure according to claim 4, wherein the second guide track extends along a direction along which the mounting portion swings.

7. The mounting structure according to claim 1, wherein an indentation region is disposed at a rear side of the body for reception of the mounting portion.

* * * * *